(12) United States Patent
Sahara

(10) Patent No.: US 9,762,307 B2
(45) Date of Patent: Sep. 12, 2017

(54) COMMUNICATION SYSTEM AND COMMUNICATION CONTROL METHOD USING INTERFERENCE CHANNEL MATRIX

(71) Applicant: KYOCERA Corporation, Kyoto-shi, Kyoto (JP)

(72) Inventor: Toru Sahara, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/784,575

(22) PCT Filed: Apr. 15, 2014

(86) PCT No.: PCT/JP2014/002124
§ 371 (c)(1),
(2) Date: Oct. 14, 2015

(87) PCT Pub. No.: WO2014/171129
PCT Pub. Date: Oct. 23, 2014

(65) Prior Publication Data
US 2016/0080063 A1 Mar. 17, 2016

(30) Foreign Application Priority Data
Apr. 15, 2013 (JP) .................................. 2013-084496

(51) Int. Cl.
*H04B 7/06* (2006.01)
*H04B 7/02* (2017.01)
(Continued)

(52) U.S. Cl.
CPC .............. *H04B 7/0639* (2013.01); *H04B 7/02* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS

2003/0068994 A1* 4/2003 Sayeed ................. H04L 1/0618
455/295
2004/0171385 A1* 9/2004 Haustein .............. H04B 7/0413
455/450
(Continued)

FOREIGN PATENT DOCUMENTS

JP 2008-86003 A 4/2008
JP 2013-30903 A 2/2013

OTHER PUBLICATIONS

International Search Report mailed Jul. 8, 2014, corresponding to International application No. PCT/JP2014/002124.
(Continued)

*Primary Examiner* — Jenee Williams
(74) *Attorney, Agent, or Firm* — Hauptman Ham, LLP

(57) ABSTRACT

A communication system includes a plurality of base stations and a plurality of communication terminals. The communication terminal calculates a desired channel matrix based on the reference signal received from the desired base station in communication therewith, also calculates an interference channel matrix based on the reference signal received from the strong interference base station having the strongest power of an interference wave affecting the communication terminal, and notifies the desired base station of the desired channel matrix and the interference channel matrix in an uplink message.

4 Claims, 6 Drawing Sheets

(51) Int. Cl.
  *H04B 7/024*  (2017.01)
  *H04B 7/0456*  (2017.01)
  *H04W 24/10*  (2009.01)

(52) U.S. Cl.
  CPC ......... *H04B 7/0617* (2013.01); *H04B 7/0626* (2013.01); *H04W 24/10* (2013.01)

(56) References Cited

U.S. PATENT DOCUMENTS

| | | | |
|---|---|---|---|
| 2008/0069038 A1 | 3/2008 | Yamamoto et al. | |
| 2009/0046800 A1* | 2/2009 | Xu | H04B 7/0617 375/267 |
| 2010/0045494 A1* | 2/2010 | Clerckx | H04B 7/0434 341/106 |
| 2010/0081424 A1* | 4/2010 | Suh | H04W 92/10 455/422.1 |
| 2010/0248656 A1* | 9/2010 | Zhou | H04B 7/0413 455/101 |
| 2010/0331007 A1* | 12/2010 | Wang | H04W 16/10 455/452.2 |
| 2011/0188393 A1* | 8/2011 | Mallik | H04B 7/024 370/252 |
| 2011/0274152 A1* | 11/2011 | Seyama | H04J 11/004 375/224 |
| 2012/0002759 A1* | 1/2012 | Lin | H04B 7/0854 375/340 |
| 2012/0281783 A1* | 11/2012 | Cheng | H04B 7/0456 375/295 |
| 2013/0301746 A1* | 11/2013 | Mobasher | H04B 7/0456 375/267 |
| 2013/0336418 A1* | 12/2013 | Tomeba | H04L 1/0003 375/267 |
| 2014/0064109 A1* | 3/2014 | Krishnamurthy | H04J 11/0053 370/252 |

OTHER PUBLICATIONS

Written Opinion of the International Searching Authority mailed Jun. 30, 2014, corresponding to International application No. PCT/JP2014/002124, for which a concise explanation is attached.
"Physical Channels and Modulation", 3GPP TS 36.211 V10.4.0, Dec. 2011.

* cited by examiner

FIG. 3

| o | | Channel matrix | $w_{o,t}$ | | | |
|---|---|---|---|---|---|---|
| | | | t=0 | t=1 | t=2 | t=3 |
| 0 | $H_0(p)$ | $H_{D1}(p,1)$ | 1 | 1 | 1 | 1 |
| 1 | $H_1(p)$ | $H_{D1}(p,2)$ | 1 | -1 | 1 | -1 |
| 2 | $H_2(p)$ | $H_{I2}(p,1)$ | 1 | 1 | -1 | -1 |
| 3 | $H_3(p)$ | $H_{I2}(p,2)$ | 1 | -1 | -1 | 1 |

COMMUNICATION SYSTEM AND COMMUNICATION CONTROL METHOD USING INTERFERENCE CHANNEL MATRIX

CROSS REFERENCE TO RELATED APPLICATION

This application is a National Phase of International Application Number PCT/JP2014/002124, filed Apr. 15, 2014, and claims priority to and the benefit of Japanese Patent Application No. 2013-084496 filed on Apr. 15, 2013, the entire contents of which are incorporated herein by reference.

TECHNICAL FIELD

This disclosure relates to a communication system capable of performing a MIMO (Multiple Input Multiple Output) communication and a communication control method of the communication system.

BACKGROUND

For LTE (Long Term Evolution) standardized by 3GPP (Third Generation Partnership Project), a CoMP (Coordinated Multi-Point transmission/reception) technology has been considered. The CoMP technology is a technology in which a base station performs beamforming with a null directed to a communication terminal in communication in another cell and thereby suppresses interference.

In the CoMP technology, the communication terminal, based on a CSI (Channel State Information) reference signal received from a neighbor base station other than the base station in communication (hereinafter, referred to as a "desired base station"), determines a base station with the strongest interference power (hereinafter, referred to as a "strong interference base station") and notifies the desired base station of the strong interference base station.

FIG. 6 illustrates an example of the mapping of the CSI reference signals in eight layers in the LTE (see NPL 1 set forth below). In FIG. 6, a horizontal axis represents time, and a vertical axis represents a frequency. Each scale of the horizontal axis represents one symbol, and each scale of the vertical axis represents one subcarrier. In the example of the mapping illustrated in FIG. 6, for two antenna ports (e.g., antenna ports 15 and 16), the CSI reference signal is arranged to the same resource elements. Therefore, the CSI reference signals are orthogonal to each other at the two antenna ports. The CSI reference signal has a length of two symbols in a time direction.

In the CoMP technology, cooperative beamforming is performed, in order to reduce the interference with the communication terminal in communication in another cell, by directing the null to the communication terminal in communication in another cell.

CITATION LIST

Non-Patent Literature

NPL 1: 3GPP TS 36.211 V10.4.0 "Physical Channels and Modulation"

SUMMARY

Technical Problem

However, there is no prescription of a way for the communication terminal to feed back, to the strong interference base station, information on the CSI reference signal received from the strong interference base station.

Also, there is another problem that, since the number of symbols having the CSI reference signal arranged thereto is small, a correlation with other layers becomes higher, hindering accurate null-direction to other layers.

In consideration of the above problems, accordingly, it could be helpful to provide a communication system and a communication control method those indicating a method for the communication terminal to feed back, to the strong interference base station, the information on the reference signal received from the strong interference base station.

Solution to Problem

In order to solve the above problems, a communication system disclosed herein having a plurality of base stations and a plurality of communication terminals, wherein the communication terminal calculates a desired channel matrix based on a reference signal received from a desired base station in communication with the communication terminal, also calculates an interference channel matrix based on a reference signal received from a strong interference base station having the strongest power of an interference wave affecting the communication terminal, and notifies the desired base station of the desired channel matrix and the interference channel matrix in an uplink message.

In order to solve the above problems, also, a communication system disclosed herein having a plurality of base stations, a plurality of communication terminals, and a base station managing apparatus, wherein a first communication terminal calculates a first desired channel matrix based on a reference signal received from a first base station in communication with the first communication terminal and notifies the first base station of the first desired channel matrix in an uplink message, a second communication terminal calculates a second desired channel matrix based on a reference signal received from a second base station in communication with the second communication terminal, also calculates a second interference channel matrix based on a reference signal received from the first base station having the strongest power of an interference wave affecting the second communication terminal, and notifies the second base station of the second desired channel matrix and the second interference channel matrix in an uplink message, the second base station notifies the base station managing apparatus of the second interference channel matrix, the base station managing apparatus notifies the first base station of the second interference channel matrix, and the first base station calculates transmission weight based on the first desired channel matrix and the second interference channel matrix.

In the communication system disclosed herein, preferably, the first base station calculates: an extended-channel matrix by multiplying the first desired channel matrix and the second interference channel matrix by an orthogonal signal; a covariance matrix based on the extended-channel matrix; and the transmission weight based on the covariance matrix.

In the communication system disclosed herein, also preferably, the orthogonal signal has a length of a layer or longer.

In order to solve the above problems, further, a communication control method disclosed herein is a communication control method of a communication system having a plurality of base stations and a plurality of communication terminals, wherein the communication terminal carries out a step of receiving a reference signal from a desired base station in communication with the communication terminal, a step of calculating a desired channel matrix based on the reference signal received from the desired base station, a step of receiving a reference signal from a strong interference base station having the strongest power of an interference wave affecting the communication terminal, a step of calculating an interference channel matrix based on the reference signal received from the strong interference base station, and a step of notifying the desired base station of the desired channel matrix and the interference channel matrix in an uplink message.

Advantageous Effect

According to the disclosure herein, a method for the communication terminal to feed back, to the strong reference base station, information on the reference signal received from the strong interference base station may be indicated.

BRIEF DESCRIPTION OF THE DRAWINGS

In the accompanying drawings:

FIG. 3 is an example of an orthogonal signal used for multiplication of the reference signal according to one embodiment;

DETAILED DESCRIPTION

Hereinafter, an embodiment of the disclosure herein will be described with reference to the accompanying drawings.

Figure 1:
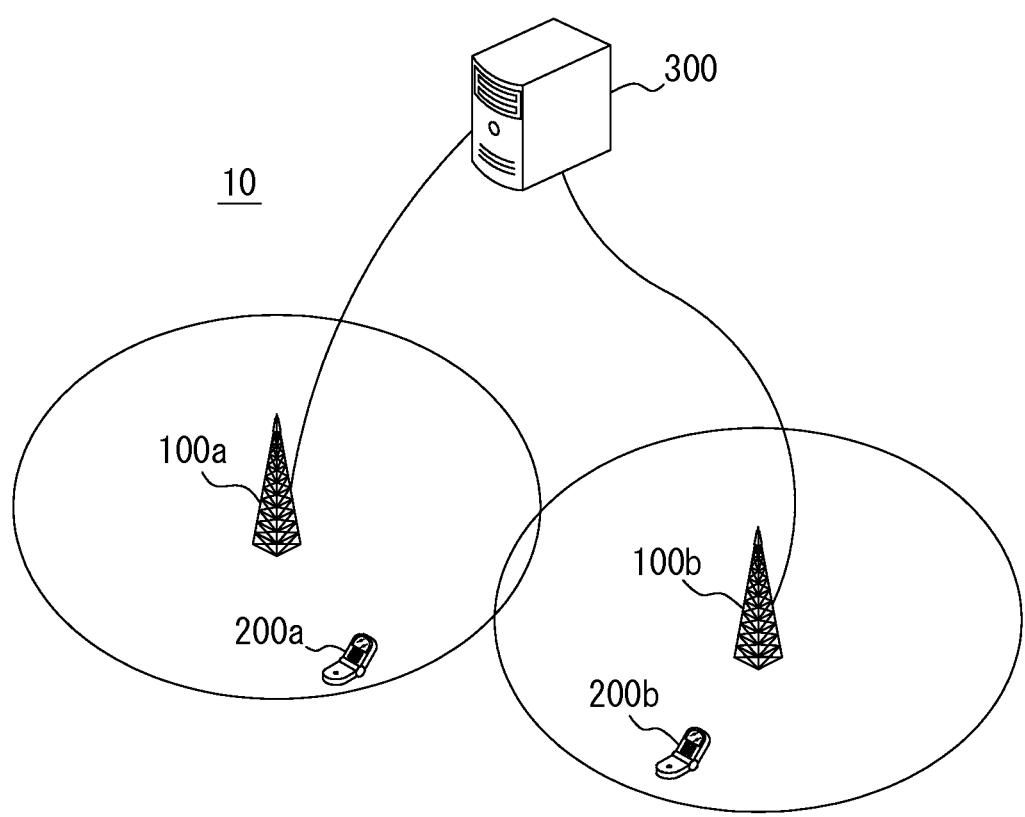
FIG. 1 is a schematic diagram of a communication system according to one embodiment.

FIG. 1 is a schematic diagram of a communication system according to one embodiment of the disclosure. A communication system 10 includes a plurality of base stations 100 (100a and 100b), a plurality of communication terminals 200 (200a and 200b), and a base station managing apparatus 300. Hereinafter, in a description common to the base station 100a and the base station 100b, the base station is simply referred to as the base station 100. Similarly, in a description common to the communication terminal 200a and the communication terminal 200b, the communication terminal is simply referred to as the communication terminal 200.

Although two base stations 100 and two communication terminals 200 are illustrated by way of example in FIG. 1, the communication system 10 may include three or more base stations 100 and three or more communication terminals 200.

The communication system 10 employs LIE. The base station managing apparatus 300 manages operations of the plurality of base stations 100. The base station managing apparatus 300 is, for example, a central base station and connected to the base stations 100 via optical fiber or the like.

According to the present embodiment, as illustrated in FIG. 1, the communication terminal 200a is located within a cell of the base station 100a and in communication therewith. For the communication terminal 200a, the base station 100b is a neighbor base station with the strongest power of an interference wave. According to the present embodiment, therefore, the base station 100a serves as a desired base station of the communication terminal 200a, and the base station 100b serves as a strong interference base station of the communication terminal 200a.

According to the present embodiment, similarly, the communication terminal 200b is located within a cell of the base station 100b and in communication therewith. For the communication terminal 200b, the base station 100a is a neighbor base station with the strongest power of the interference wave. According to the present embodiment, therefore, the base station 100b serves as a desired base station of the communication terminal 200b, and the base station 100a serves as a strong interference base station of the communication terminal 200b.

Figure 2:
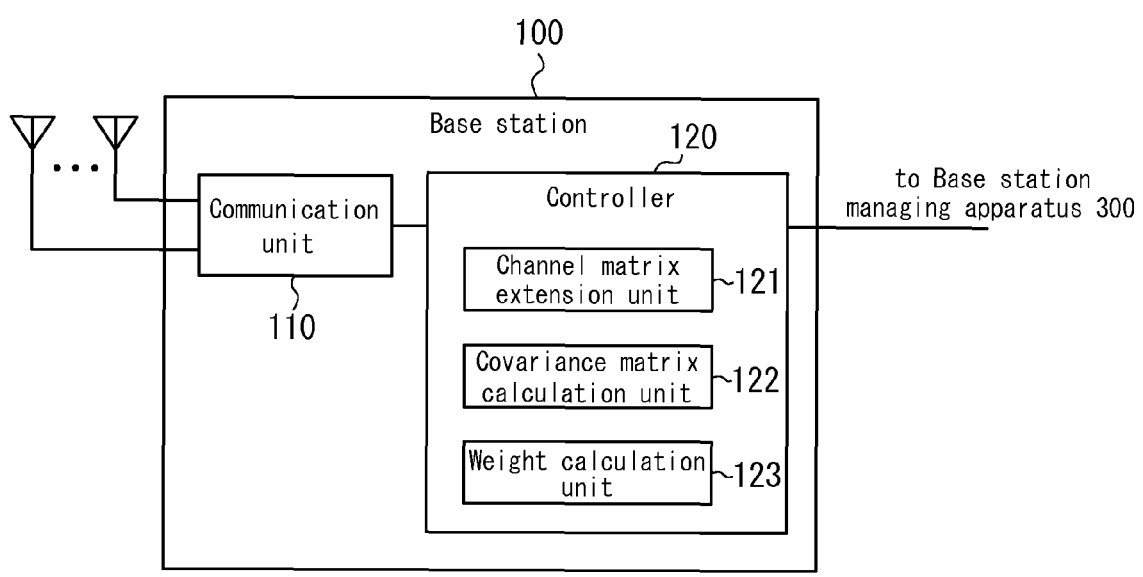
FIG. 2 is a schematic block diagram of a base station according to one embodiment.

FIG. 2 is a schematic block diagram of the base station according to one embodiment of the disclosure.

The base station 100 includes a communication unit 110 and a controller 120. The controller 120 includes a channel matrix extension unit 121, a covariance matrix calculation unit 122 and a weight calculation unit 123. Hereinafter, the base station in FIG. 2 is assumed as the base station 100a of FIG. 1.

The communication unit 110, via an adaptive array antenna made up of a plurality of antennas, exchanges data (a radio signal) with the communication terminal 200a by using a radio communication.

The communication unit 110, when receiving the data, down-converts the received radio signal into a baseband signal and carries out operations such as AD conversion and Fourier transformation on the baseband signal. Also, the communication unit 110, when transmitting the data, generates a transmission radio signal by carrying out operations such as inverse Fourier transformation and DA conversion on transmission data received from the controller 120 and up-converting a baseband signal obtained through the DA conversion.

The controller 120 controls and manages the entire base station 100 including each functional block thereof. The controller 120 may be constituted by using software executed by any appropriate processor such as a CPU (Central Processing Unit), or a dedicated processor (for example, DSP (Digital Signal Processor)) specialized for each operation.

The channel matrix extension unit 121, as shown in Formula 1, multiplies the channel matrix directly obtained from the communication terminal 200a and the channel matrix obtained from the communication terminal 200b via the base station 100b and the base station managing apparatus 300 by an orthogonal signal w shown in FIG. 3. The orthogonal signal w has a length of a layer or longer, as illustrated in FIG. 3.

Here, the channel matrix directly obtained from the communication terminal 200a is a channel matrix estimated by the communication terminal 200a from a CSI reference signal received from the base station 100a in communication therewith and directly obtained by the base station 100a from the communication terminal 200a. Hereinafter, the channel matrix estimated by the communication terminal 200 from the CSI reference signal received from the base station 100 in communication therewith is referred to as a "desired channel matrix".

Also, the channel matrix obtained from the communication terminal 200b via the base station 100b and the base station managing apparatus 300 is a channel matrix estimated by the communication terminal 200b from the CSI reference signal received from the strong interference base station 100a and obtained by the base station 100a from the communication terminal 200b via the base station 100b and the base station managing apparatus 300. Hereinafter, the channel matrix estimated by the communication terminal 200 from the CSI reference signal received from the strong interference base station 100 is referred to as an "interference channel matrix".

FIG. 3 illustrates an example when the communication terminal 200 has two antennas (an antenna 1 and an antenna 2). $H_{D1}(p,1)$ represents the desired channel matrix of the antenna 1 estimated by the communication terminal 200a, and $H_{D1}(p,2)$ represents the desired channel matrix of the antenna 2 estimated by the communication terminal 200a. Also, $H_{I2}(p,1)$ represents the interference channel matrix of the antenna 1 estimated by the communication terminal 200b, and $H_{I2}(p,2)$ represents the interference channel matrix of the antenna 2 estimated by the communication terminal 200b.

As illustrated in FIG. 3, the subscript "O" in $H_O(p)$ takes a value of 0 to 3. Also, $H_0(p)$, $H_1(p)$, $H_2(p)$, $H_3(p)$ correspond to $H_{D1}(p,1)$, $H_{D1}(p,2)$, $H_{I2}(p,1)$, $H_{I2}(p,2)$, respectively.

$$b_O(p,t) = w_{O,t}^* H_O(p) \quad \text{[Formula 1]}$$

where $b_o$ represents the channel matrix multiplied by the orthogonal signal w, and p represents an antenna port. Hereinafter, the channel matrix $b_o$ multiplied by the orthogonal signal w is referred to as an "extended-channel matrix".

The covariance matrix calculation unit 122 as shown in Formula 2, calculates a covariance matrix from the extended-channel matrix $b_o$.

$$R_{XX} = \sum_{O=0}^{3} b_O \cdot (b_O)^H + N \cdot I \quad \text{[Formula 2]}$$

where $R_{XX}$, N, and I represent the covariance matrix, thermal noise, and a unit matrix, respectively. Also, the subscript H represents complex conjugate transpose.

The weight calculation unit 123, as shown in Formula 3, calculates transmission weight of the adaptive array directing a beam to the antenna 1 of the communication terminal 200a from the channel matrix and the covariance matrix. Also, the weight calculation unit 123, as shown in Formula 4, calculates the transmission weight of the adaptive array directing the beam to the antenna 2 of the communication terminal 200a from the channel matrix and the covariance matrix. By using the transmission weight calculated from the Formula 3 and the Formula 4, beamforming with a null directed to the communication terminal 200b is performed.

$$W_D(1) = (H_o)^H (R_{XX})^{-1} \quad \text{[Formula 3]}$$

$$W_D(2) = (H_1)^H (R_{XX})^{-1} \quad \text{[Formula 4]}$$

where $W_D$ represents the transmission weight.

Figure 4:
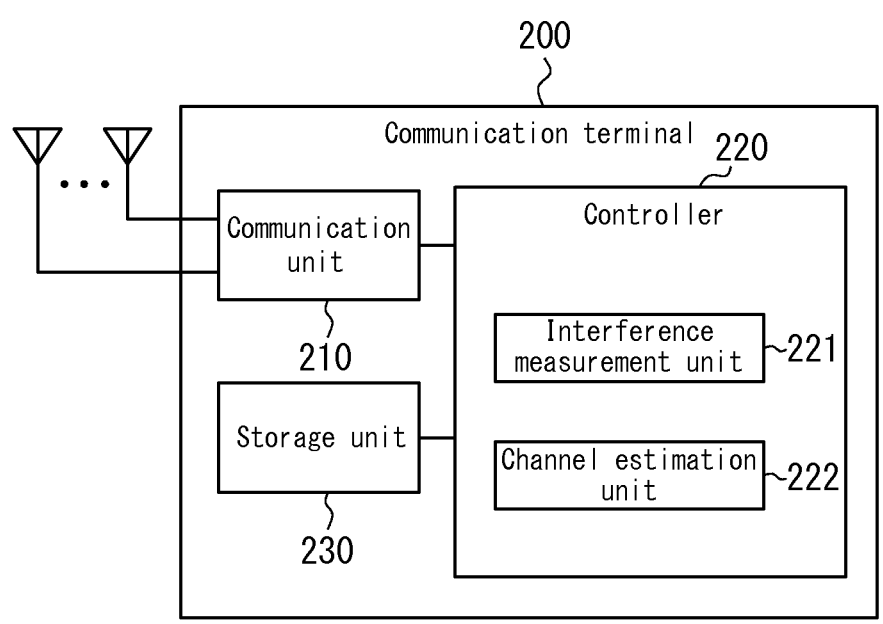
FIG. 4 is a schematic block diagram of a communication terminal according to one embodiment.

FIG. 4 is a schematic block diagram of the communication terminal according to one embodiment of the disclosure.

The communication terminal 200 includes a communication unit 210, a controller 220, and a storage unit 230. The controller 220 includes an interference measurement unit 221 and a channel estimation unit 222. Hereinafter, the communication terminal in FIG. 4 is assumed as the communication terminal 200a of FIG. 1.

The communication unit 210, via the adaptive array antenna made up of a plurality of antennas, exchanges the data (the radio signal) with the base station 100a by using the radio communication.

The communication unit 210, when receiving the data, down-converts the received radio signal into the baseband signal and carries out the operations such as the AD conversion and the Fourier conversion on the baseband signal. Also, the communication unit 210, when transmitting the data, generates the transmission radio signal by carrying out the operations such the inverse Fourier transformation and the DA conversion on the transmission data received from the controller 220 and up-converting the baseband signal obtained through the DA conversion.

The controller 220 controls and manages the entire communication terminal 200 including each functional block thereof. The controller 220 may be constituted by using the software executed by any appropriate processor such as the CPU, or the dedicated processor (for example, the DSP) specialized for each operation.

The interference measurement unit 221 measures the power of the interference wave from the CSI reference signal received from the base station other than the base station 100a in communication with the communication terminal 200.

The channel estimation unit 222, as shown in Formula 5, calculates the desired channel matrix from the CSI reference signal received from the base station 100a serving as the desired base station and a known CSI reference signal.

$$H_{D1}(p,k) = \frac{\sum_{t''=0}^{1} \dfrac{a_{k,t''}^{(p)}}{ideala_{k,t''}^{(p)}}}{2} \quad \text{[Formula 5]}$$

where $H_{D1}$ represents the desired channel matrix, a represents the received CSI reference signal, ideala represents the known CSI reference signal, and k represents an antenna number of the communication terminal. For 1", refer to 6.10.5 "CSI reference signals" of the NPL 1 set forth above.

The channel estimation unit 222, by using a formula similar to the Formula 5, calculates the interference channel matrix $H_{I1}$ from the CSI reference signal received from the base station 100b serving as the strong interference base station and the known CSI reference signal.

The storage unit 230 stores the known CSI reference signal.

Figure 5:
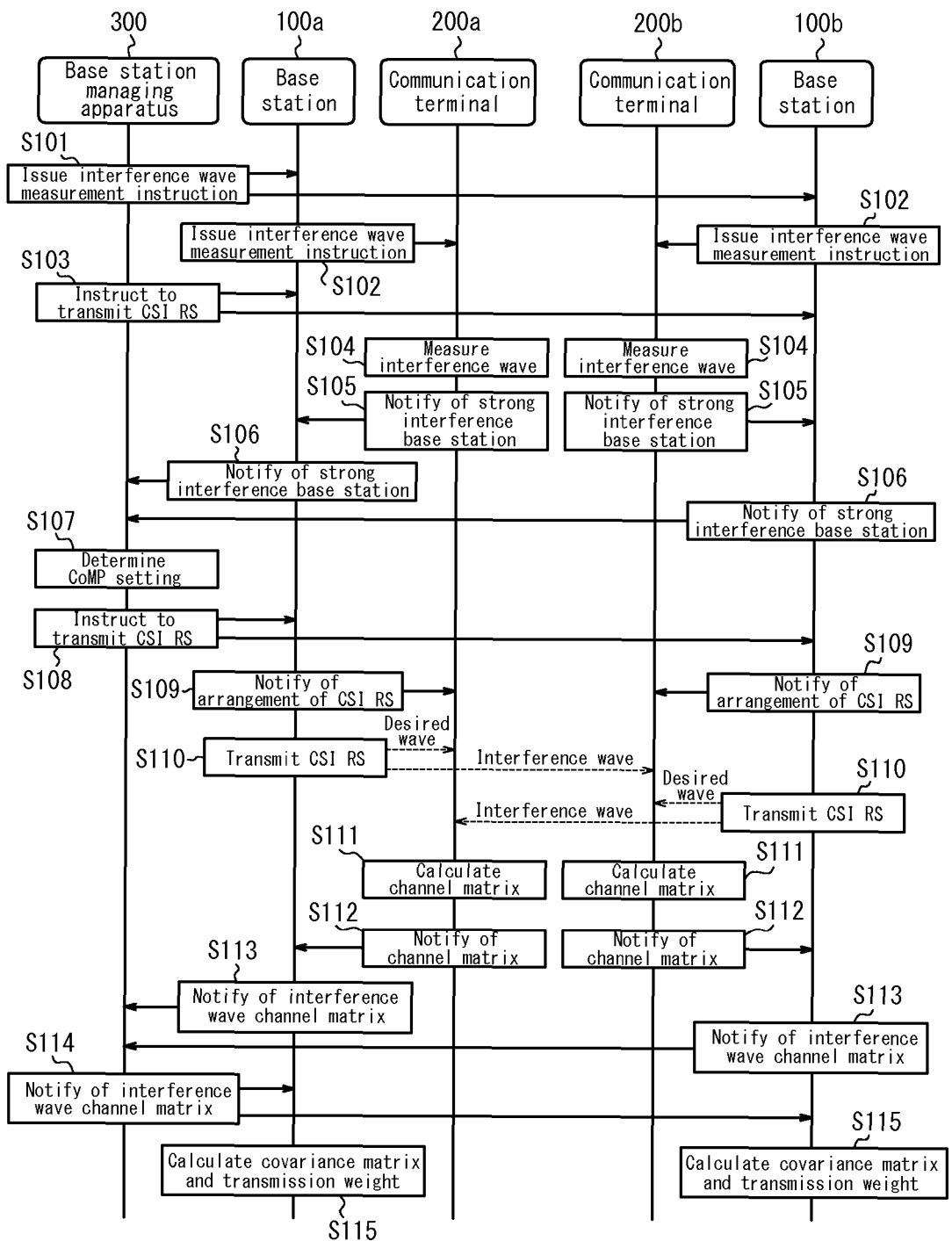
FIG. 5 is a sequence diagram illustrating an operation of the communication system according to one embodiment.
Figure 6:
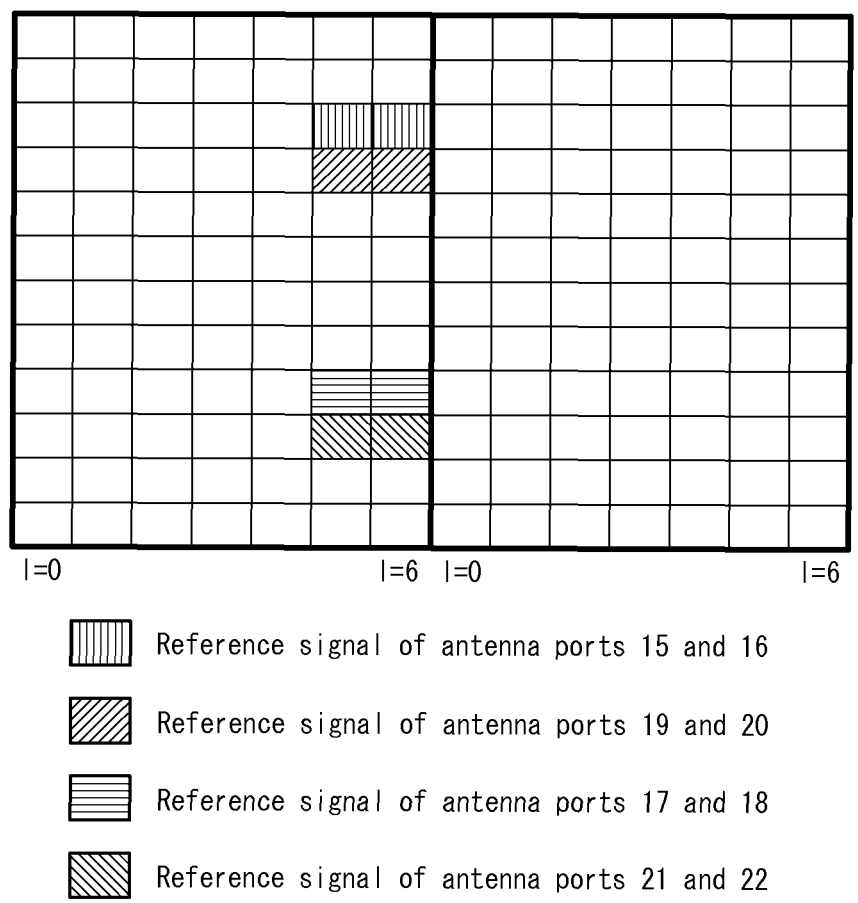
FIG. 6 is a diagram illustrating an example of the mapping of CSI reference signals in eight layers in LTE.

Referring to a sequence diagram illustrated in FIG. 5, an operation of the communication system 10 according to one embodiment of the disclosure will be described.

According to the present embodiment, as described above, the base station 100a serves as the desired base station of the communication terminal 200a, and the base station 100b serves as the strong interference base station of the communication terminal 200a. Also, the base station 100b serves as the desired base station of the communication terminal 200b, and the base station 100a serves as the strong interference base station of the communication terminal 200b.

The base station managing apparatus 300 issues an interference wave measuring instruction to the base station 100a and the base station 100b (S101).

The base station 100a issues the interference wave measuring instruction to the communication terminal 200a. The interference wave measuring instruction includes information on the mapping of the CSI reference signal transmitted by the base station 100b serving as the strong interference base station of the communication terminal 200a. Similarly, the base station 100b issues the interference wave measuring instruction to the communication terminal 200b (S102).

The base station managing apparatus 300 instructs the base station 100a and the base station 100b to transmit the CSI reference signal.

The interference measurement unit 221 of the communication terminal 200a measures the interference waves from the neighbor base stations. Similarly, the interference measurement unit 221 of the communication terminal 200b measures the interference waves from the neighbor base stations (S104).

The communication terminal 200a determines that the power of the interference wave received from the base station 100b is the strongest and informs the base station 100a in an uplink message that the base station 100b is the strong interference base station. Similarly, the communication terminal 200b determines that the power of the interference wave received from the base station 100a is the strongest and informs the base station 100b in an uplink message that the base station 100a is the strong interference base station (S105).

The base station 100a informs the base station managing apparatus 300 of that the base station 100b serves as the strong interference base station of the communication terminal 200a. Similarly, the base station 100b informs the base station managing apparatus 300 of that the base station 100a serves as the strong interference base station of the communication terminal 200b (S106).

The base station managing apparatus 300, based on the information on the strong interference base stations obtained from the base station 100a and the base station 100b, determines CoMP setting, i.e., determines layers used for the transmission to the respective base stations (S107).

The base station managing apparatus 300 instructs the base station 100a and the base station 100b to transmit the CSI reference signal (S108).

The base station 100a notifies the communication terminal 200a of information on arrangements of the CSI reference signals transmitted by the base station 100a and the base station 100b. Similarly, the base station 100b notifies the communication terminal 200b of information on the arrangements of the CSI reference signals transmitted by the base station 100a and the base station 100b (S109).

The base station 100a and the base station 100b transmit the CSI reference signals (S110). Here, the CSI reference signal transmitted by the base station 100a serves as a desired wave of the communication terminal 200a and also as an interference wave of the communication terminal 200b. Similarly, the CSI reference signal transmitted by the base station 100b serves as a desired wave of the communication terminal 200b and also as an interference wave of the communication terminal 200a.

The channel estimation unit 222 of the communication terminal 200a calculates the desired channel matrix $H_{D1}$ based on the CSI reference signal received from the base station 100a and also calculates the interference channel matrix $H_{I1}$ based on the CSI reference signal received from the base station 100b. Similarly, the channel estimation unit 222 of the communication terminal 200b calculates the desired channel matrix $H_{D2}$ based on the CSI reference signal received from the base station 100b and also calculates the interference channel matrix $H_{I2}$ based on the CSI reference signal received from the base station 100a (S111).

The communication terminal 200a notifies the base station 100a of the desired channel matrix $H_{D1}$ and the interference channel matrix $H_{I1}$ in the uplink message. Similarly, the communication terminal 200b notifies the base station 100b of the desired channel matrix $H_{D2}$ and the interference channel matrix $H_{I2}$ in the uplink message (S112).

The base station 100a notifies the base station managing apparatus 300 of the interference channel matrix $H_{I1}$ received from the communication terminal 200a. Similarly, the base station 100b notifies the base station managing apparatus 300 of the interference channel matrix $H_{I2}$ received from the communication terminal 200b (S113).

The base station managing apparatus 300 notifies the base station 100b of the interference channel matrix $H_{I1}$ received from the base station 100a. Also, the base station managing apparatus 300 notifies the base station 100a of the interference channel matrix $H_{I2}$ received from the base station 100b (S114).

The base station 100a calculates the extended-channel matrix by multiplying the desired channel matrix $H_{D1}$ directly obtained from the communication terminal 200a and the interference channel matrix $H_{I2}$ obtained from the communication terminal 200b via the base station 100b and the base station managing apparatus 300 by the orthogonal signal and, based on the extended-channel matrix thus obtained, calculates the covariance matrix and the transmission weight. Similarly, the base station 100b calculates the extended-channel matrix by multiplying the desired channel matrix $H_{D2}$ directly obtained from the communication terminal 200b and the interference channel matrix $H_{I12}$ obtained from the communication terminal 200a via the base station 100a and the base station managing apparatus 300 by the orthogonal signal and, based on the extended-channel matrix thus obtained, calculates the covariance matrix and the transmission weight (S115).

According to the present embodiment, as described above, the base station 100a (100b) receives the desired channel matrix from the communication terminal 200a (200b) in communication therewith, and also receives the interference channel matrix from the communication terminal 200b (200a) via the strong interference base station 100b (100a) and the base station managing apparatus 300. Then, the base station 100a (100b), based on the desired channel matrix and the interference channel matrix, calculates the transmission weight of the adaptive array. Thereby, the base station 100a (100b) may perform beamforming with the null directed to the communication terminal 200b (200a) in communication in another cell.

According to the present embodiment, also, the channel matrix extension unit 121 calculates the extended-channel matrix by multiplying the desired channel matrix and the interference channel matrix by the orthogonal signal w, and the covariance matrix calculation unit 122 by using the extended-channel matrix thus obtained, calculates the covariance matrix. Then, the weight calculation unit 123, by using the covariance matrix thus obtained, calculates the transmission weight of the adaptive array. Therefore, even when the number of the symbols having the CSI reference signal is small, the beamforming with the null directed to the communication terminal 200b (200a) in communication in another cell may be performed.

Although the disclosure has been described based on the figures and the embodiment, it is to be understood that various modifications and changes may be implemented based on the present disclosure by those who are ordinarily

REFERENCE SIGNS LIST

| | |
|---|---|
| 10 | communication system |
| 100 | base station |
| 110 | communication unit |
| 120 | controller |
| 121 | channel matrix extension unit |
| 122 | covariance matrix calculation unit |
| 123 | weight calculation unit |
| 200 | communication terminal |
| 210 | communication unit |
| 220 | controller |
| 221 | interference measurement unit |
| 222 | channel estimation unit |
| 230 | storage unit |
| 300 | base station managing apparatus |

The invention claimed is:

1. A communication system, comprising:
a plurality of base station;
a plurality of communication terminals; and
a base station managing apparatus, wherein
a first communication terminal calculates a first desired channel matrix based on a reference signal received from a first base station in communication with the first communication terminal and notifies the first base station of the first desired channel matrix in an uplink message,
a second communication terminal calculates a second desired channel matrix based on a reference signal received from a second base station in communication with the second communication terminal, also calculates a second interference channel matrix based on a reference signal received from the first base station having the strongest power of an interference wave affecting the second communication terminal, and notifies the second base station of the second desired channel matrix and the second interference channel matrix in an uplink message,
the second base station notifies the base station managing apparatus of the second interference channel matrix,
the base station managing apparatus notifies the first base station of the second interference channel matrix, and
the first base station calculates transmission weight based on the first desired channel matrix and the second interference channel matrix.

2. The communication system according to claim 1, wherein the first base station calculates: an extended-channel matrix by multiplying the first desired channel matrix and the second interference channel matrix by an orthogonal signal, a covariance matrix based on the extended-channel matrix, and the transmission weight based on the covariance matrix.

3. The communication system according to claim 2, wherein the orthogonal signal has a length of a layer or longer.

4. A communication control method of a communication system having a plurality of base stations, a base station managing apparatus and a plurality of communication terminals, the communication control method comprising:
calculating, by a first communication terminal, a first desired channel matrix based on a reference signal received from a first base station in communication with the first communication terminal;
notifying, by the first communication terminal, the first base station of the first desired channel matrix in an uplink message;
calculating, by a second communication terminal,
a second desired channel matrix based on a reference signal received from a second base station in communication with the second communication terminal, and
a second interference channel matrix based on a reference signal received from the first base station having the strongest power of an interference wave affecting the second communication terminal;
notifying, by the second communication terminal, the second base station of the second desired channel matrix and the second interference channel matrix in an uplink message,
notifying, by the second base station, the base station managing apparatus of the second interference channel matrix;
notifying, by the base station managing apparatus, the first base station of the second interference channel matrix; and
calculating, by the first base station, transmission weight based on the first desired channel matrix and the second interference channel matrix.

* * * * *